United States Patent

[11] 3,537,510

[72] Inventors George C. Rannenberg
 Canton;
 Bartholomew J. Davison, Simsbury, and
 Charles B. Brahm, Ellington, Connecticut
[21] Appl. No. 752,046
[22] Filed Aug. 12, 1968
[45] Patented Nov. 3, 1970
[73] Assignee United Aircraft Corporation
 East Hartford, Connecticut
 a corporation of Delaware

[54] PRESSURE AND TEMPERATURE REGULATOR FOR AIRCRAFT BLEED AIR SYSTEM
 6 Claims, 1 Drawing Fig.
[52] U.S. Cl. .................................................. 165/32,
 98/1.5, 236/92
[51] Int. Cl. ................................................ G05d 23/00

[50] Field of Search .......................................... 165/31, 32,
 15, 40; 98/1.5; 236/92

[56] References Cited
 UNITED STATES PATENTS
 2,474,441  6/1949  Sparrow ..................... 165/15
 2,858,075  10/1958  Le May, Jr. et al. .......... 165/15
 3,445,317  5/1969  Marshall et al. ............. 165/40

Primary Examiner—Charles Sukalo
Attorney—Norman Friedland

ABSTRACT: The load on a precooler heat exchanger is controlled by utilizing an existing pressure-regulating valve and locating the pressure-regulating valve in proximity to the heat exchanger and limiting the flow through the precooler as a function of temperature sensed downstream of the heat exchanger.

Patented Nov. 3, 1970
3,537,510
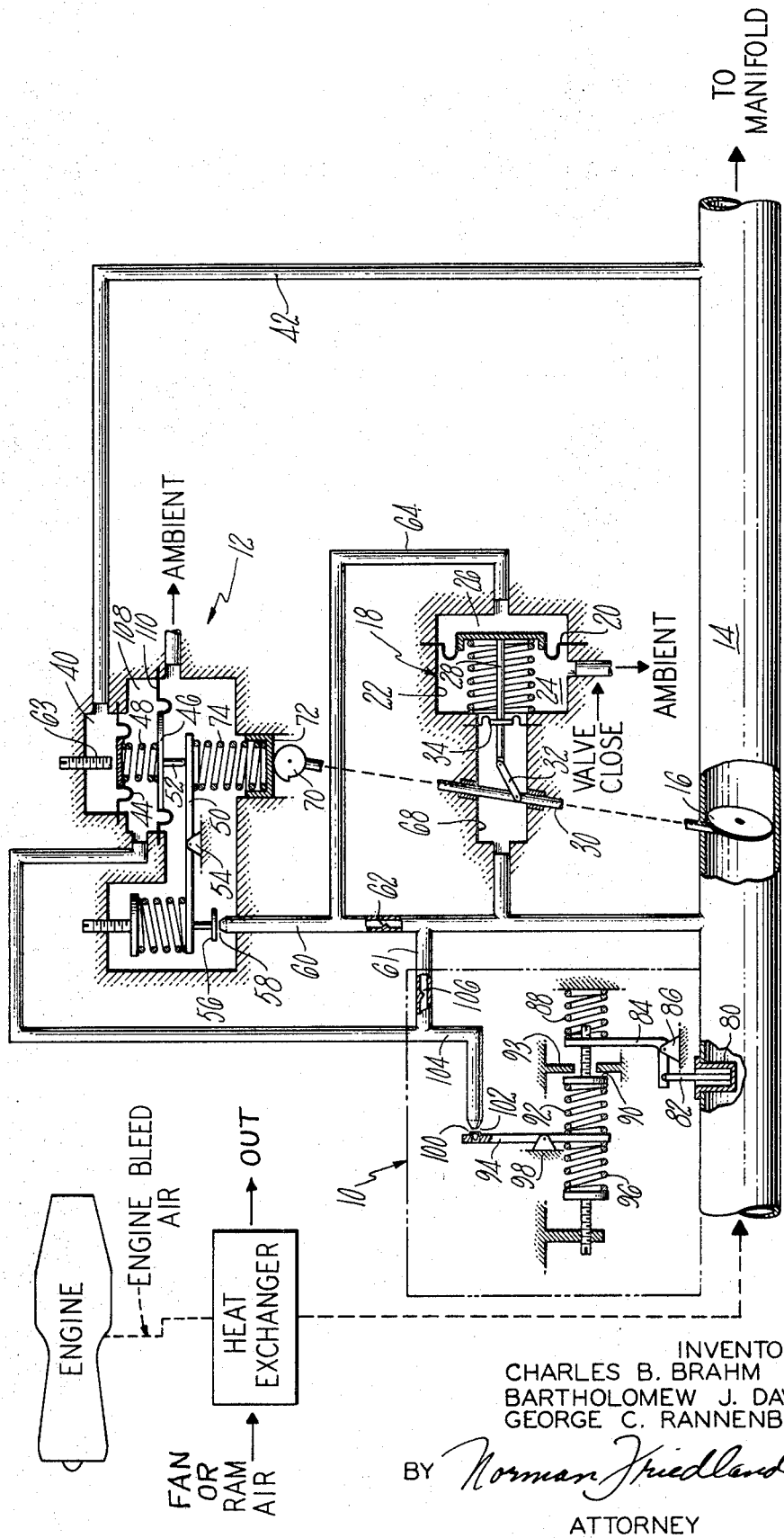
INVENTORS,
CHARLES B. BRAHM
BARTHOLOMEW J. DAVISON
GEORGE C. RANNENBERG
BY *Norman Friedland*
ATTORNEY

PRESSURE AND TEMPERATURE REGULATOR FOR AIRCRAFT BLEED AIR SYSTEM

CROSS REFERENCE TO RELATED APPLICATIONS

This application relates to an application entitled Combined Pressure and Temperature Regulator, filed by Bartholomew J. Davison on the same date and assigned to the same assignee.

BACKGROUND OF THE INVENTION

In the air-conditioning systems for aircraft it is customary to bleed off air from the engine which is cooled for air-conditioning purposes. The same air can also be utilized to drive accessories which usually have varying load requirements.

In designing the heat exchanger for cooling the engine bleed air, one has to take into consideration the load capacity for the severest condition, that is, when the maximum bleed air is required at all engine operations.

In certain applications, however, the heat exchanger would be so large to handle the heat load for the extreme conditions, which may occur only occasionally, that its size and weight would not be acceptable for aircraft applications.

We have found that we can reduce the size of the heat exchanger while reducing the possibility of overheating the air to an intolerable level, by locating the pressure regulator in proximity to the heat exchanger and limiting flow as a function of temperature sensed downstream of the heat exchanger.

SUMMARY OF THE INVENTION

A primary object of this invention is to provide means to limit the heat load capacity of a heat exchanger in an aircraft air-conditioning system.

Another object of this invention is to provide means to limit the heat load capacity of a heat exchanger in an aircraft air-conditioning system by limiting flow through the heat exchanger as a function of temperature of the fluid sensed downstream thereof.

Other features and advantages will be apparent from the specification and claims and from the accompanying drawings which illustrates an embodiment of the invention.

The sole figure schematically illustrates a preferred embodiment of this invention wherein the temperature sensor is generally indicated by numeral 10 and the combined pressure and temperature controller is generally illustrated by numeral 12.

In the preferred embodiment duct 14 serves to transmit pressurized fluid bled off a turbine type of powerplant which fluid is precooled by a heat exchanger prior to being distributed to an air-conditioning system for cooling the cabin of the aircraft and/or other pneumatic drives.

Throttle valve 16 which may take the form of a suitable butterfly valve is disposed in duct 14 downstream of the heat exchanger and serves to regulate the pressure and temperature downstream thereof in accordance with the signal produced by controller 12 as will be described herewithin. Movement of valve 16 is controlled by actuator 18 which comprises diaphragm 20 dividing chamber 22 into two subchambers 24 and 26. Diaphragm 20 carries plunger 28 which in turn is suitably connected to shaft 30 by linkage 32. The linkage serves to rotate the shaft 30 which in turn is connected to the valve element of valve 16 for imparting rotary movement thereto. A second diaphragm 34 closes off the end of chamber 24 and is continually subjected to high pressure.

Looking for the moment at the pressure controller 12 which serves to control the pressure in duct 14 by varying the area of valve 16, pressure sensed downstream of valve 16 is admitted into chamber 40 via line 42 where it acts on the face of diaphragm 44. Force developed by diaphragm 44 is transmitted to platen 46 via spring 48 which in turn transmits a force to fulcrum lever 50 via the depending member 52. Fulcrum lever 50 pivots about the pivot 54 to control flapper valve 56 connected on the opposite end thereof. Flapper valve 56 moves relative to the orifice 58 located at the end of line 60 which serves to control the flow of fluid discharging therefrom for controlling the pressure drop across restriction 62. Obviously, this controls the pressure in lines 60 and 64 and the pressure in chamber 26.

From the foregoing it is apparent that flapper element 56 controls actuator 18 and hence valve 16 as a function of pressure in the duct 14. Obviously, when flapper element 56 abuts against orifice 58 no pressure drop will be evidenced across restriction 62 and the pressure in chamber 26 and hence pressure acting on face of diaphragm 20 will be the same as the pressure in chamber 68 acting on the face of diaphragm 34. Since diaphragm 20 is larger than diaphragm 34 the forces created thereby will cause the actuator to move leftwardly rotating valve 16 in the full open position.

Conversely, when the flapper element 56 is caused to move away from orifice 58 a pressure drop will be evidenced across fixed restriction 62 reducing pressure in chamber 26 allowing the actuator to move rightwardly to rotate valve element 16 toward the closed position.

An adjustable screw 63 is disposed in chamber 40 to abut against diaphragm 44 to limit the travel thereof. This screw is so positioned that when under normal pressure control, without excessive temperatures, the downstream pressure is free to fully open valve 16. This screw provides one of the elements of temperature override as described later so as to achieve temperature-limiting accuracy.

Position feedback is effectuated by varying the height of spring 74 which abuts against fulcrum lever 50 and slideable spring retainer 72. As can be seen by the drawing, cam 70 suitably mounted for rotation is rotated by shaft 30. Hence, the position of valve 16 is transmitted via shaft 30, cam 70, spring retainer 72 and spring 74 to fulcrum lever 50 for restoring the flapper valve element to its original position to balance out the system.

The next portion of the description will describe the temperature sensor and controller. The temperature sensor and controller 10 transmits a pressure signal to the pressure and temperature controller 12 which is proportional to temperature in the duct 14. Temperature of the fluid in the duct line is sensed by the temperature sensor comprised of elements 80 and 82 which are composed of materials with different coefficients of thermal expansion. As temperature increases 80 expands more than 82 resulting in a counterclockwise motion of bellcrank 84 pivotally connected to pivot 86. Hence, a change in temperature rotates bellcrank 84 which has one end bearing against spring 88. This end carries adjustable spring retainer 90 which serves to position spring 92 against fulcrum lever 94. This spring is balanced by adjustable spring 96 and serves to impart a balancing force on fulcrum lever 94 which pivots about pivot member 98. This in turn positions flapper element 100 relative to orifice 102 located at the end of pipe 104. Obviously fulcrum lever receives a force imparted by the temperature sensor at one end of the pivot and an additional force imparted by the fluid impinging on flapper element 100, discharging from pipe 104. The purpose of this arrangement is to eliminate the varying pressures that are normally attendent a servosystem that utilizes engine bleed as supply pressure, thus pressure in pipe 104 is proportional only to temperature in duct 14.

From the foregoing it is apparent that fulcrumed lever 94 sees the forces imparted by the fluid discharging from orifice 102 and the force of spring 92 less the spring force of spring 96. This arrangement makes fulcrum lever 94 insensitive to varying supply pressure.

Stop 93 serves to prevent the temperature controller from producing a signal when the temperature sensed by temperature sensor 80 is below a predetermined value. Hence, it is obvious that in this mode, that is when spring retainer 90 abuts against stop 93 the temperature controller is rendered inoperative and the pressure in line 104 is held to a constant value resulting in operation with only the pressure regulator controlling, via diaphragm 44. Conversely, when diaphragm 44 abuts against screw 63 the pressure regulator is rendered inoperative and the temperature controller can be the sole controller.

The temperature controller servo works in a manner similar to the pressure regulator servo. Fulcrumed lever 94 carries at one end flapper 100 which moves relative to orifice 102 for varying the pressure drop across fixed restriction 106. This acting on the face of diaphragm 46. The force generated by diaphragm 46 is transmitted to fulcrumed lever 50 for controlling flapper 56 and hence actuator 18 for moving throttle valve 16. Hence, when temperature exceeds a predetermined value, notwithstanding the pressure, valve 16 is moved to a closed position to reduce the flow in the heat exchanger and prevent the temperature from exceeding a predetermined value.

While this specification shows a preferred embodiment where the pressure regulating valve is mounted downstream of the heat exchanger, it is to be understood that this mechanism can be located upstream of the heat exchanger. However, it is necessary that the temperature sensor is located downstream of the heat exchanger.

It should be understood that the invention is not limited to the particular embodiments shown and described herein, but that various changes and modifications may be made without departing from the spirit or scope of this novel concept as defined by the following claims.

We claim:

1. For an aircraft pneumatic system utilizing propulsive engine bleed air having a precooler for precooling the air bled from the engine prior to the use thereof comprising, in combination:
   a duct interconnecting the engine and the heat exchanger for passing engine bleed air therethrough;
   valve means in said duct located downstream of said heat exchanger for controlling pressure and flow;
   means responsive to pressure in said duct for controlling said valve means for limiting the pressure of the engine bleed air; and
   means responsive to the temperature in said duct downstream of the heat exchanger for limiting the temperature of the engine bleed air discharging from said heat exchanger.

2. An aircraft pneumatic system as described in claim 1 wherein said heat exchange places said engine bleed air in indirect heat exchange relation with ram air.

3. For an aircraft pneumatic system utilizing propulsive engine bleed air having a precooler for precooling the air bled from the engine prior to the use thereof comprising, in combination:
   a duct interconnecting the engine and the heat exchanger for passing engine bleed air therethrough;
   valve means in said duct for controlling pressure and flow;
   means responsive to pressure in said duct for controlling said valve means for limiting the pressure of the engine bleed air;
   means responsive to the temperature in said duct downstream of the heat exchanger for limiting the temperature of the engine bleed air discharging from said heat exchanger; and
   a pressure sensor sensing the pressure downstream of said heat exchanger.

4. An aircraft engine bleed air system utilizing bleed air for air-conditioning and pneumatic drives comprising, in combination:
   duct means connecting the air-conditioning system and pneumatic drives;
   a heat exchanger disposed in said duct upstream of the air-conditioning system and pneumatic drives;
   means including at least one valve disposed in said duct for controlling the flow through said heat exchanger;
   said means being responsive to pressure of the engine bleed air downstream of said valve in said duct; and
   said means also being responsive to temperature of the engine bleed air downstream of said heat exchanger.

5. For an aircraft pneumatic system utilizing propulsive engine bleed air, comprising, in combination:
   a duct interconnecting the engine and the aircraft pneumatic system for passing said engine bleed air therethrough;
   a heat exchanger in the duct for cooling the air bled from the engine;
   valve means in said duct;
   means responsive to pressure in said duct downstream of said valve means for controlling said valve means for limiting the pressure of the engine bleed air; and
   means responsive to temperature in said duct downstream of said heat exchanger for controlling said valve means for limiting the temperature of the engine bleed air discharging from said heat exchanger.

6. An aircraft engine bleed air system utilizing bleed air for air-conditioning and pneumatic drives comprising, in combination:
   duct means connecting the air-conditioning system and pneumatic drives;
   a heat exchanger disposed in said duct upstream of the air-conditioning system and pneumatic drives;
   means including at least one valve disposed in said duct for controlling the flow through said heat exchanger;
   said means being responsive to pressure of the engine bleed air in said duct; and
   said means also being responsive to temperature of the engine bleed air intermediate said valve and said heat exchanger downstream of said heat exchanger.